United States Patent
Hom et al.

(10) Patent No.: US 6,650,076 B1
(45) Date of Patent: Nov. 18, 2003

(54) CURRENT PROFILE METHOD AND APPARATUS FOR CONTROLLING GATE OPERATION

(75) Inventors: Wayne C. Hom, Rancho Santa Margarita, CA (US); Daniel Perez, Foothill Ranch, CA (US)

(73) Assignee: Elite Access Systems, Inc., Lake Forest, CA (US)

( * ) Notice: Subject to any disclaimer, the term of this patent is extended or adjusted under 35 U.S.C. 154(b) by 0 days.

(21) Appl. No.: 10/280,524

(22) Filed: Oct. 24, 2002

(51) Int. Cl.[7] .................................................. H02P 1/00
(52) U.S. Cl. ..................... 318/457; 318/456; 318/280; 318/282; 318/286; 318/461; 318/466; 318/468; 49/348; 49/349; 49/138
(58) Field of Search .................. 318/457, 280, 318/282, 286, 456, 461, 466, 468; 49/348, 349, 138

(56) References Cited

U.S. PATENT DOCUMENTS

| | | | | |
|---|---|---|---|---|
| 4,503,723 A | * | 3/1985 | Reid .............................. | 74/96 |
| 4,735,018 A | * | 4/1988 | Duncan et al. ................ | 49/340 |
| 5,230,179 A | * | 7/1993 | Richmond et al. ............. | 49/28 |
| 5,653,056 A | * | 8/1997 | Stark ............................. | 49/43 |
| 5,869,940 A | * | 2/1999 | Parsadayan .................. | 318/461 |
| 6,150,785 A | * | 11/2000 | Butscher et al. ............ | 318/468 |

* cited by examiner

Primary Examiner—Bentsu Ro
Assistant Examiner—Rina I. Duda
(74) Attorney, Agent, or Firm—Randall L. Reed, Esq.; Levin IP Group

(57) ABSTRACT

A method and apparatus for moving a gate a distance in a predetermined period of time. In one embodiment the current load for an electric motor to move a gate is first measured to determine whether the gate's motion is being hindered or helped. A microprocessor then controls voltage supplied to the motor to enhance or retard the evolved power of the motor according to the load and the predetermined time.

18 Claims, 5 Drawing Sheets

| Measured Current Draw | Calculated Effective Mass | $T_0$-$T_2$ | $T_2$-$T_3$ | $T_3$-$T_4$ | Total Time |
|---|---|---|---|---|---|
| 5.0 amps. | 50 Kg. | 3.5 seconds | 7.0 seconds | 3.5 seconds | 14 seconds |
| 5.2 amps. | 51 Kg. | 3.8 seconds | 6.4 seconds | 3.8 seconds | 14 seconds |
| 5.5 amps. | 52.5 Kg. | 4.1 seconds | 5.8 seconds | 4.1 seconds | 14 seconds |
| 5.8 amps. | 54 Kg. | 5.0 seconds | 4.0 seconds | 5.0 seconds | 14 seconds |
| 6.0 amps. | 54.5 Kg. | 5.5 seconds | 3.0 seconds | 5.5 seconds | 14 seconds |

Figure 5

CURRENT PROFILE METHOD AND APPARATUS FOR CONTROLLING GATE OPERATION

FIELD OF THE INVENTION

This invention relates to powered gate openers and more particularly to regulating the power used to open and close powered gates.

BACKGROUND OF THE INVENTION

Powered gates are frequently employed to move gates, such as those which control access to a parking lot, to a gated community, or to private land, for example, by means of a power-drive unit which moves the gate between open and closed positions. The gate may move horizontally along a guide way or may swing about a vertical hinge axis to open and close the gate.

A typical power-drive unit for these gates includes an electric motor mechanically coupled to a gate to cause the gate to move between open and closed positions. The limits of movement of the gate itself are often set by use of conventional limit switches or by simply timing the cycle of opening or closing by approximation. Alternatively, the mechanism of the gate operator may be configured such that an approximate opened and closed position for the gate is set by the mechanical operation constraints of the mechanism itself.

The action of a gate through a cycle may also be controlled by use of a microprocessor executing a program and controlling the power unit. The term microprocessor is used herein and will be understood by those skilled in the art to refer to a computer or programmable circuit having a memory, inputs and outputs and a CPU, or equivalent circuit. In this manner the power unit may be used to more finely tune the motion of the gate to achieve a smoother cycle, avoid mechanical stresses to the gate, or otherwise program the action of or access to the gate. Use of the microprocessor allows the power supplied to the gate to be programmably varied during the cycle according to a calculated acceleration profile. Such a method and apparatus for moving a gate according to a calculated or predetermined acceleration profile is disclosed in co-pending application entitled DYNAMIC ADJUSTMENT METHOD & APPARATUS FOR CONTROLLING GATE OPERATION, by the same inventors and incorporated by reference herein.

It would be desirable to have a gate that completes an opening or closing cycle each time in a predictable, set period of time. This is most evident when multiple gates are used in tandem such as a master/slave configuration.

A problem, however, arises when the gate is of a different inertia or effective mass than that of one calculated by or assumed in the programming of the microprocessor, which might be based on a gate of standard inertia or mass. This may be caused by many environmental variables, such as wind blowing with or against the opening gate, a child stepping on the gate for a ride, when dirt or ice is caught in the mechanism of the gate, etc. It can also occur when the gate itself has been improperly mounted or has become misaligned over time. The microprocessor, programmed to execute an acceleration profile for a gate of a given mass, will take longer to complete a cycle when the gate has a heavier effective mass than anticipated. Likewise, the gate will complete the cycle more rapidly when the gate has a lighter effective mass than anticipated, for example when it is being pushed by wind or out of plumb or on a downward slope.

Moreover, in some applications a microprocessor-controlled powered gate may be moved according to an acceleration profile having different phases, the phases calculated to achieve a smooth action of the gate through the cycle. For example, a gate may be run through acceleration, running and deceleration phases, which allow the gate to be efficiently moved and come to a smooth stop. From this initial measurement of sampling an appropriate acceleration profile is determined to bring the gate from an initial position, through acceleration, running and deceleration phases. This phased cycling method is also predicated on an assumed mass for a gate and it is desirable to cause the gate to complete the cycle of phases each time in the same period of time.

SUMMARY OF THE INVENTION

A solution to the above problem has been devised. With a desired time to complete a cycle known, the effective inertia or mass of the gate is first measured upon initial movement of the gate. The output of the power unit can then be controlled by an acceleration profile varied to move the gate through the cycle in the desired time. This initial test of the effective inertia or mass of the gate can be taken with each initiation of a cycle so that, for example, a gate stopped in mid-cycle will reinitiate with the test when it is again moved, perhaps in an opposite direction.

Where the power unit is an electric motor, a measurement of the current needed to power the motor correlates with the effective inertia or mass of the gate. The desired cycle time, known output of the motor and the effective inertia or mass can then be factored to calculate an acceleration profile to be executed to cause the gate to complete its cycle within the desired time period.

This same method may be used with a phased cycle type of acceleration profile. The phased acceleration profile may itself be calculated according to an initial measurement of the mass of the gate, then, further attenuated to cause the gate to complete all of the phases, the cycle, in the desired period of time.

For an electric motor, for example, the current needed by the motor to produce sufficient force to move a gate is proportional to the effective inertia or mass of the gate; a greater effective mass of the gate will require greater current to move the gate. The microprocessor can then dynamically program the acceleration, running and deceleration phases through the cycle, determined by calculation from an algorithm or from a lookup table, to achieve a completion of the cycle in the desired time.

A method for moving a powered gate through an opening or closing cycle in a predetermined period of time is disclosed that comprises the steps of providing a gate that is mechanically connected to be moved by a power unit, wherein power to the power unit is regulated by a microprocessor; providing power to the power unit and measuring the power required of the power unit to move the gate; the apparent mass of the gate is then determined based on the power drawn by the power unit. The gate is then accelerated and decelerated through an opening or closing cycle based on an acceleration profile. The acceleration profile is either calculated by the microprocessor algorithmically. or by reference to a lookup table stored in memory by which the microprocessor retrieves appropriate instructions as to how to move the gate through a cycle.

Preferably the microprocessor is used to determine an acceleration profile comprised of an acceleration phase, a running phase and a deceleration phase that will move a gate of a given mass through a cycle in a predetermined period of time. The power provided the power unit, based on the measurement of the apparent mass of the gate, is attenuated to move the gate from a start position through the acceleration profile and complete the cycle to stop the gate at a predetermined end position. In most cases the acceleration phase and the deceleration phase take a substantially equivalent period of time, but this is not required.

In the preferred embodiment the power unit is an electrical motor and current provided to the electrical motor is regulated by a microprocessor. Current is provided to the electrical motor and measured by the microprocessor to determine a correlated apparent mass of the gate, and, current to the electrical motor is attenuated by the microprocessor to move the gate through the acceleration profile.

The microprocessor may be use to determine the apparent mass of the gate by providing a predetermined speed parameter based on a known mass of a gate. Electricity is supplied to the motor, and the current drawn by the motor is sampled a plurality of times to determine the load on the motor. The samples are then quantized and the used to arrive at an acceleration variable based on the samples. The speed of the motor is adjusted based on the acceleration variable, typically from the start position to a predetermined end position through acceleration, running and deceleration phases.

The present invention also encompasses an apparatus for moving a powered gate through an opening or closing cycle in a predetermined period of time. A gate that is mechanically connected to be moved by a power unit and power to the power unit is regulated by a microprocessor. The power required to cause the power unit to move the gate is first measured to determine a value proportional to the apparent mass of the gate, then the microprocessor determines an acceleration profile based on the determined apparent mass of the gate. The microprocessor then regulates the power to the power unit so that the gate is moved from a start position through the acceleration profile to stop the gate at a predetermined end position. This apparatus is further designed to be operated according to the above methods of this invention.

BRIEF DESCRIPTION OF THE DRAWINGS

FIG. 5 is a lookup table for use with the present invention.

DESCRIPTION OF THE INVENTION

The following detailed description, and the figures to which it refers, are provided for the purpose of describing examples and specific embodiments of the invention only and are not intended to exhaustively describe all possible examples and embodiments of the invention.

Figure 1:
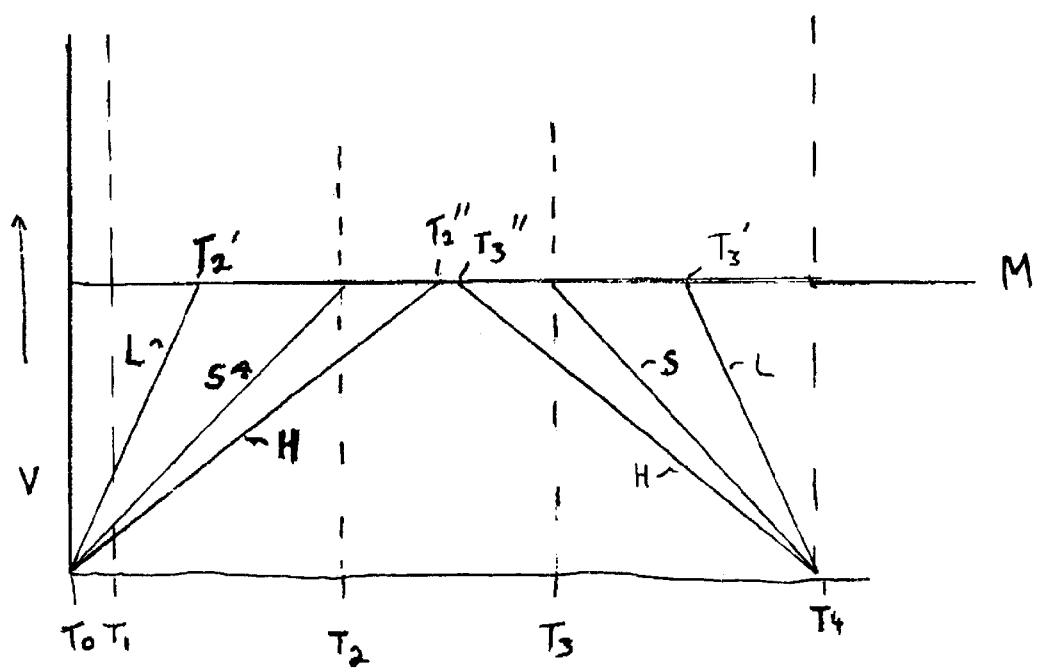
FIG. 1 is a velocity versus time graph of comparative acceleration profiles for an exemplary gate of different effective masses, accelerated to complete a cycle in the same period of time.

Referring now to FIG. 1, a graph of different acceleration profiles used for a gate to complete a cycle of the same desired time is shown. At the start, $T_0$ (time=0), the gate is at rest. At period $T_0$–$T_1$, the breakaway phase, an electric motor whose characteristic power output and current requirements are known is given a command to accelerate a gate of known mass to a known speed or to maximum speed (depending on the mass calculated or estimated and the desired time of operation). The current drawn by the motor to initially move the gate is measured and used by the microprocessor executing the program to calculate the effective inertia or mass of the gate. Once the effective inertia or mass of the gate is determined, an acceleration profile can be calculated to move the gate through its cycle in the desired time period to the endpoint $T_4$.

For comparison purposes the acceleration of a lighter gate is shown as line L, with a standard gate shown as line S and a heavier gate shown as line H. In this example the lighter gate has a steeper acceleration and deceleration curves for gate movement, i.e. the lighter gate reaches running speed more quickly, shown at $T_2'$–$T_3'$ ($T_2''$–$T_3''$ for the heavier gate). Because this gate is effectively lighter the running speed is slowed so that it will be delayed just long enough to complete the cycle in the desired time. For a heavier gate more time is needed to bring the gate to running speed, so the running speed during the running phase is increased just enough to cause the gate to complete the cycle in the desired time.

The heavier gate, line H, is accelerated and decelerated for a longer period of time to allow it to reach the end point at the end of the desired time period. The lighter gate, line L, is accelerated and decelerated for a shorter period of time. The lighter gate in this example is accelerated less and moved at a slower constant speed after acceleration to cause it to complete the cycle in the desired amount of time. In all cases a combination of attenuating the acceleration and constant speed of the gate are combined to cause the gate to complete the cycle in the desired time.

Figure 2:
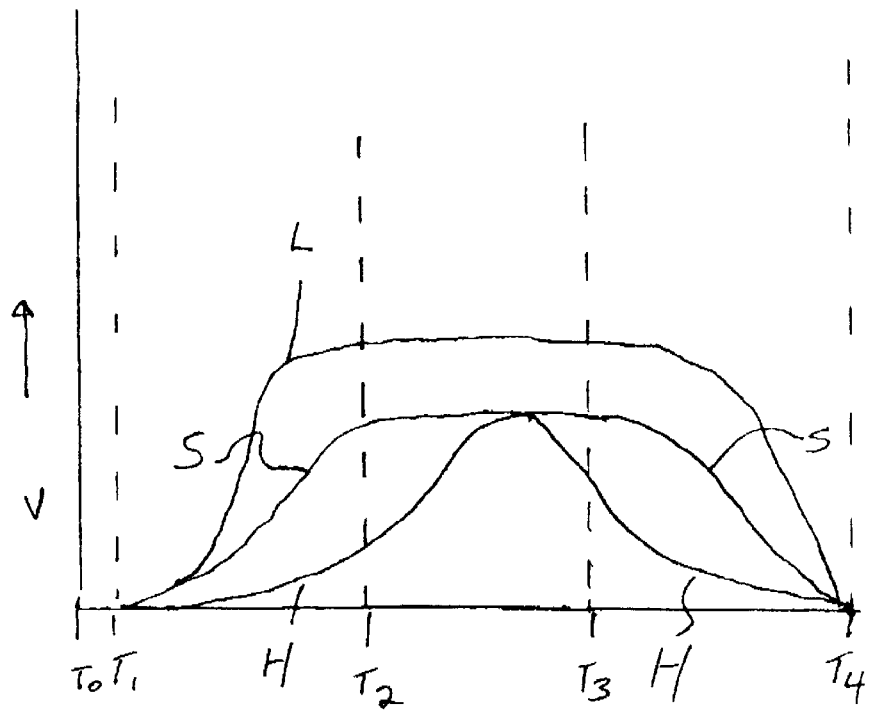
FIG. 2 is a graph of comparative acceleration profiles for an exemplary gate of different effective masses and cycling through acceleration, running and deceleration phases, accelerated to complete a cycle in the same period of time.

Referring now to FIG. 2, a graph is shown of the comparative acceleration profiles of another method of the present invention. This method is employed when a gate using an acceleration profile including acceleration, running and deceleration phases is used. By way of example a swing type gate may be moved through an opening or closing cycle as shown at FIGS. 3a–3e. A graph of time vs. velocity of the gate is shown, the corresponding respective positions of the swing-type gate during these phases are detailed in FIGS. 3a–3e, for example, in about ten seconds.

Figure 3:
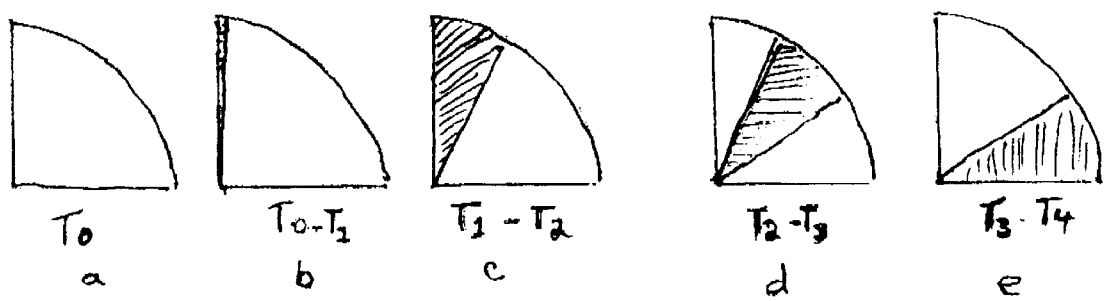
FIGS. 3a–3e are graphs of the motion of a swing type gate as it is moved through the acceleration, running and deceleration phases of FIG. 2.

At the start, $T_0$ (time=0), the gate is at rest corresponding to FIG. 3a). From period $T_0$–$T_2$, (corresponding FIGS. 3a and 3b) the gate is in the acceleration phase and is accelerated to a running speed, shown as line segment R. Period $T_0$–$T_1$ (corresponding FIG. 3b) is the breakaway phase, the initial part of the acceleration phase where the current drawn by the gate is measured to determine the acceleration profile of the remainder of the cycle. Period $T_1$–$T_2$ (corresponding to FIG. 3c) is the is the acceleration phase exclusive of the breakaway phase. The $T_2$–$T_3$ period (corresponding FIG. 3d) is the running phase, where the motor drives the gate at a speed that is either limited to a given speed or represents the maximum output of the electric motor. Period $T_3$–$T_4$ is the deceleration phase, the deceleration beginning at $T_3$. This deceleration phase slows the gate to allow for a smooth closure at the end position $T_4$.

In all cases a combination of attenuating the acceleration period, the constant speed and the deceleration period of the cycle are used to cause the gate to complete the cycle in the desired time.

Figure 4:
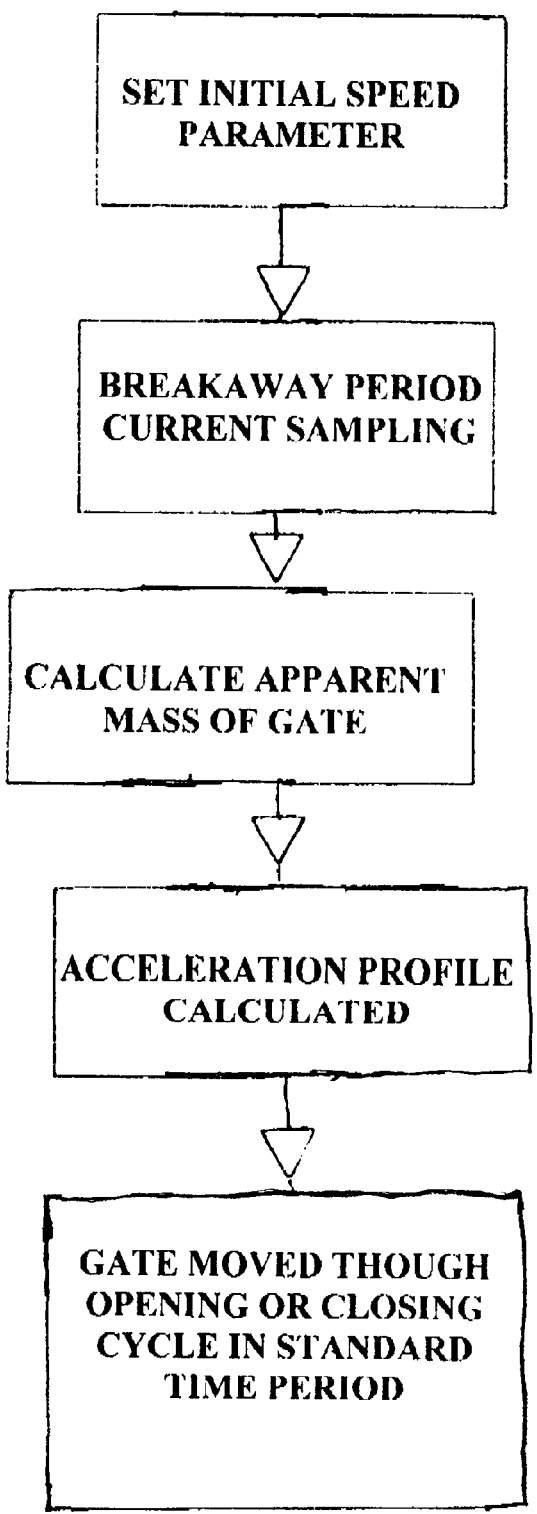
FIG. 4 is a flow diagram of a method of the present invention.

A broad aspect the method of the present invention is show in FIG. 4. In this method parameters are known for the electric motor used including the power output of the motor being used and the proportional current drawn by the motor for a given delivered power output. Also known is the distance the gate must travel during the cycle are known and the desired time to complete the cycle.

In the breakaway phase the electric motor is supplied with current and the current is measured. The correlation between the current used and the power needed to drive the gate may be inferred mathematically. The effective inertia or mass of the gate may then be inferred mathematically from the power needed to move the gate. An acceleration profile is then calculated and executed by the microprocessor, regulating the electric motor to cause it to move the gate to complete the cycle in the desired time.

The amount of power needed by an electric motor can be calculated because a conductor immersed in a magnetic field will produce a force (F) that can be calculated as a product of the magnetic flux density (B), the current (I) through the conductor and the length of the conductor (L):

$$F=B*I*L$$

A similar effect occurs when the conductor is moved at certain velocity (v) through a magnetic field (B). A voltage (E) is generated between the ends of the conductor based on the following formula:

$$E=-B*L*v$$

Motion in an electric motor is achieved by applying an electric current to the winding and, as a result of the motion, a voltage will be generated. This voltage generation (E) will always oppose the flow of the applied current. In an electric motor the conductor takes the form of coiled turns. The torque (T) developed on each turn of such coil is often alternately expressed as a function of the current (I) and the velocity (v) of the moving conductor:

$$T=I*v$$

In an electric motor the velocity is actually expressed as angular velocity because the winding conductor is circular and is rotating inside of the magnetic field, the above formula can be expressed as:

$$T=I*d\ddot{e}/dO \quad (1)$$

Where $d\ddot{e}$ is the magnetic flux linking the winding and $dO$ is the angular displacement.

In the same way, the voltage generated in each turn of winding could be expressed as being fully proportional to the velocity, in this case:

$$E=d\ddot{e}/dO=\text{angular velocity} \quad (2)$$

The normal way to apply current through a conductor is by applying voltage across the ends of the conductor. Upon the application of a voltage motion will result as the current flows and a voltage (E) will be generated as the conductor moves. An electrical model to describe this behavior a formula for an electric motor is:

$$V=RwI+KeW \quad (3)$$

Where V=Voltage applied to the motor (or conductor wire, winding); Rw=Equivalent resistance of the conductor (in this case the current carrying element of the winding resistance); Ke=voltage constant empirically measured for a given motor winding; W=angular speed of the shaft of the motor, and I=current through the conductor winding.

The force or torque required to create motion by an electric motor can be determined by taking into account that the current (I) is proportional to the torque by the angular displacement as coefficient from equation 1. If a linear relationship between the current (I) and the torque (T) is desired the coefficient in this equation must remain constant, which is to say that the angular displacement must remain constant.

To keep the angular displacement constant in an electric motor the voltage is kept constant, as shown in equation 2. Keeping the voltage (V) constant will cause a constant angular displacement and therefore will cause a linear relationship between the torque generated by the motor, creating gate motion, and the current through the winding of the motor.

Measuring the current of an electric motor to determine the load on an electric motor can be done in many different ways. In the preferred embodiment a integro-differential analysis is used to quantize the current and therefore the load on the motor. This is performed by the utilization of an analog to digital (A/D) converter as a transducer between a current sensor and the microprocessor unit.

In the preferred embodiment the microprocessor unit samples the current for a pre-determined time period, expressed as:

$$L(n)=I(n)| \text{ from } t_0-tx$$

Where $t_0$=start time of capturing one or more current samples; tx=end time of capture of samples; I(n)=the quantized value of the motor current sample at $t_0$-ts, where ts=interval of time between samples and ts<=tx; n=number of samples such, and N=maximum number of samples.

This is the equivalent of:

$$L1=I(d\ddot{e}/dO)*T(n)$$

Again, d/dO is the angular displacement, so $d\ddot{e}/dO=Kv*V$ where Kv=a voltage constant and V=voltage applied to the motor. Therefore:

$$I1Kv*V*T(n)$$

If a constant voltage is applied to the motor then: L1=I1Kvt*T(n) so that the quantization of the current is a representation of the torque or force to create motion. Because, in the present invention, the load is the actual gate along with the middle interconnection elements such gear boxes, pulleys, arms, friction between parts and the like, we can say then that the system comprising the gate and the interconnection elements required to move the gate create a load on the motor according to:

$$I=Kg*Wg$$

where Kg=relation between the motor shaft load and effective load to move the gate and Wg=is a quantization value of the effective torque or force to move the gate at a sampling point.

Therefore L1 can be expressed as a function of the gate systems itself:

$$L=(Kvt/Kg)*Wg(n)$$

Where Kvt=product of the voltage constants, angular speed and current and torque; Kg=relation between the motor shaft load and effective load to move the gate, and Wg(n)= quantization values of the effective torque or force to move the gate at sampling points n.

The quantization values of the motor current as described above represent the force required to move a gate element, in other words we can determine how "heavy" or "light" the gate is and act accordingly.

The current measured is therefore proportional to a given effective inertia or mass of the gate. Once the effective inertia or mass is known, the acceleration profile for a phased or non-phased acceleration profile can be attenuated to cause the gate to complete its cycle in the desired time.

Although the methods of the present invention are exemplified for an electric motor, this method may also be used with other power units, such as an internal combustion engine. In the case of a non-electric power unit the effective torque on the power unit is measured during the breakaway phase.

In one embodiment, once the effective inertia or mass of the gate is known the microprocessor may use a lookup table stored in memory to determine an appropriate acceleration profile, an exemplary lookup table is shown in FIG. 5. The values of the table of FIG. 5 are for illustrative purposes only and are not actual calculated values, which depend on the motor and gate used. In the example the speed of the gate during the running phase of an acceleration profile is adjusted to complete the cycle in the same amount of time. Alternatively, for acceleration profiles having fewer or more phases, the various phases may be attenuated to achieve the same result. The lookup table may therefore be used for both phased and non-phased acceleration profiles, for a phased cycle to determine the appropriate periods for the acceleration, running and deceleration phases.

Figure 6:
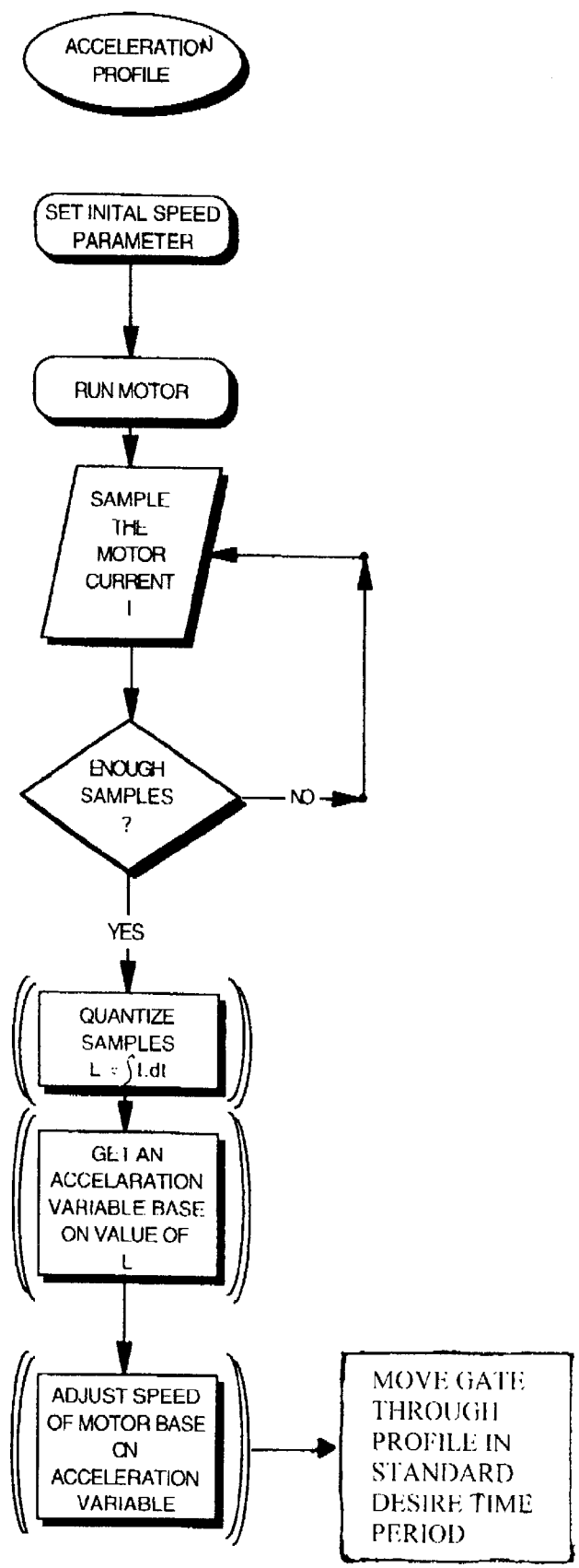
FIG. 6 is a flow diagram of a method of the present invention.

Alternatively, in the preferred embodiment the microprocessor is programmed to calculate an appropriate acceleration profile depending on the gate used through the use of a lookup table comprising predetermined profiles or coefficients in which the idealized profile is modified by a variable value to account for the measured effective mass of the gate. In the method of the preferred embodiment, as shown in the flow diagram of FIG. 6, an acceleration profile for a given condition is determined by first programming the microprocessor to move the gate at an initial speed, during the breakaway phase, at an initial speed parameter. The motor is then run during a breakaway phase and the current draw of the motor is sampled. One or more samples may be taken until an accurate sampling has been achieved.

The samples are then quantized as outlined above to arrive at an acceleration variable according to the method above. Finally the acceleration profile, the acceleration, running and deceleration phases is selected or calculated and the gate is moved through that acceleration profile in the desired time by adjusting the current to the electric motor.

It will be appreciated that the invention has been described here above with reference to certain examples or preferred embodiments as shown in the drawings. Various additions, deletions, changes and alterations may be made to the above-described embodiments and examples without departing from the intended spirit and scope of this invention. Accordingly, it is intended that all such additions, deletions, changes and alterations be included within the scope of the following claims.

What is claimed is:

1. A method for moving a powered gate through an opening or closing cycle in a predetermined desired time period comprising the steps of:
    a) providing a gate that is mechanically connected to be moved by a power unit, wherein power to the power unit is regulated by a microprocessor,
    b) providing power to the power unit and measuring the power required of the power unit to move the gate,
    c) executing a program with the microprocessor to determine the effective inertia or mass of the gate based on the power drawn by the power unit,
    d) further executing the program with the microprocessor to determine an acceleration profile calculated to move the gate from a start position to a predetermined end position in a predetermined desired time, and,
    e) executing the program to attenuate the power provided the power unit to cause the gate to move from the start position to the predetermined end position in the desired period of time.

2. The method of claim 1 wherein the acceleration profile is determined by mathematically calculating an acceleration profile.

3. The method of claim 1 wherein the acceleration profile is determined by referring to a lookup table.

4. The method of claim 1 wherein the power unit is an electrical motor and the power provided is electrical current provided to the electrical motor that is regulated by the microprocessor, current is provided to the electrical motor and measured by the microprocessor to determine a correlated effective inertia or mass of the gate, and, current provided to the electrical motor is attenuated by the microprocessor to move the gate through the acceleration profile.

5. The method of claim 4 wherein the effective initial inertia or mass is determined by:
    a) supplying electricity to the motor,
    b) sampling the current drawn by the motor one or more times to determine the load on the motor,
    d) quantizing the samples,
    e) determining an acceleration variable based on the samples, and
    d) adjusting the speed of the motor based on the acceleration variable.

6. The method of claim 5 wherein the acceleration profile is determined by mathematical calculation by the microprocessor, without reference to a lookup table.

7. The method of claim 5 wherein the acceleration profile is mathematically calculated by the microprocessor using a lookup table for reference.

8. The method of claim 7 wherein the microprocessor further determines an acceleration profile having an acceleration phase, a running phase and a deceleration phase.

9. The method of claim 8 wherein the acceleration phase and the deceleration phase take a substantially equivalent period of time.

10. The method of claim 8 wherein the acceleration phase and the deceleration phase take different periods of time.

11. An apparatus for moving a powered gate through an opening or closing cycle in a predetermined period of time, comprising:
    a gate that is mechanically connected to be moved by a power unit, wherein power to the power unit is regulated by a microprocessor,
    the power required to cause the power unit to move the gate is first measured to determine a value proportional to the effective inertia or mass of the gate and the microprocessor determines an acceleration profile based on the determined effective inertia or mass of the gate to move the gate from a start position through the acceleration profile to stop the gate at a predetermined end position in a predetermined period of time, and
    the microprocessor can regulate the power to the power unit so that the gate is moved from a start position through the acceleration profile to stop the gate at a predetermined end position.

12. The apparatus of claim 11 wherein the acceleration profile is determined by mathematically calculating an acceleration profile.

13. The apparatus of claim 11 wherein the acceleration profile is determined by referring to a lookup table.

14. The apparatus of claim 11 wherein the power unit is an electrical motor and the power provided is electrical voltage to the electrical motor that is regulated by the microprocessor, current is provided to the electrical motor and measured by the microprocessor to determine a correlated effective inertia or mass of the gate, and, voltage provided to the electrical motor is attenuated by the microprocessor to move the gate through the acceleration profile.

15. The apparatus of claim 14 wherein the effective initial inertia or mass is determined by:
  a) supplying electricity to the motor,
  b) sampling the current drawn by the motor one or more times to determine the load on the motor,
  d) quantizing the samples,
  e) determining an acceleration variable based on the samples, and
  d) adjusting the speed of the motor based on the acceleration variable.

16. The apparatus of claim 15 wherein the acceleration profile is determined by mathematical calculation by the microprocessor, without reference to a lookup table.

17. The apparatus of claim 15 wherein the acceleration profile is mathematically calculated by the microprocessor using a lookup table for reference.

18. The apparatus of claim 11 wherein the microprocessor further determines an acceleration profile having an acceleration phase, a running phase and a deceleration phase.

* * * * *